2,713,247

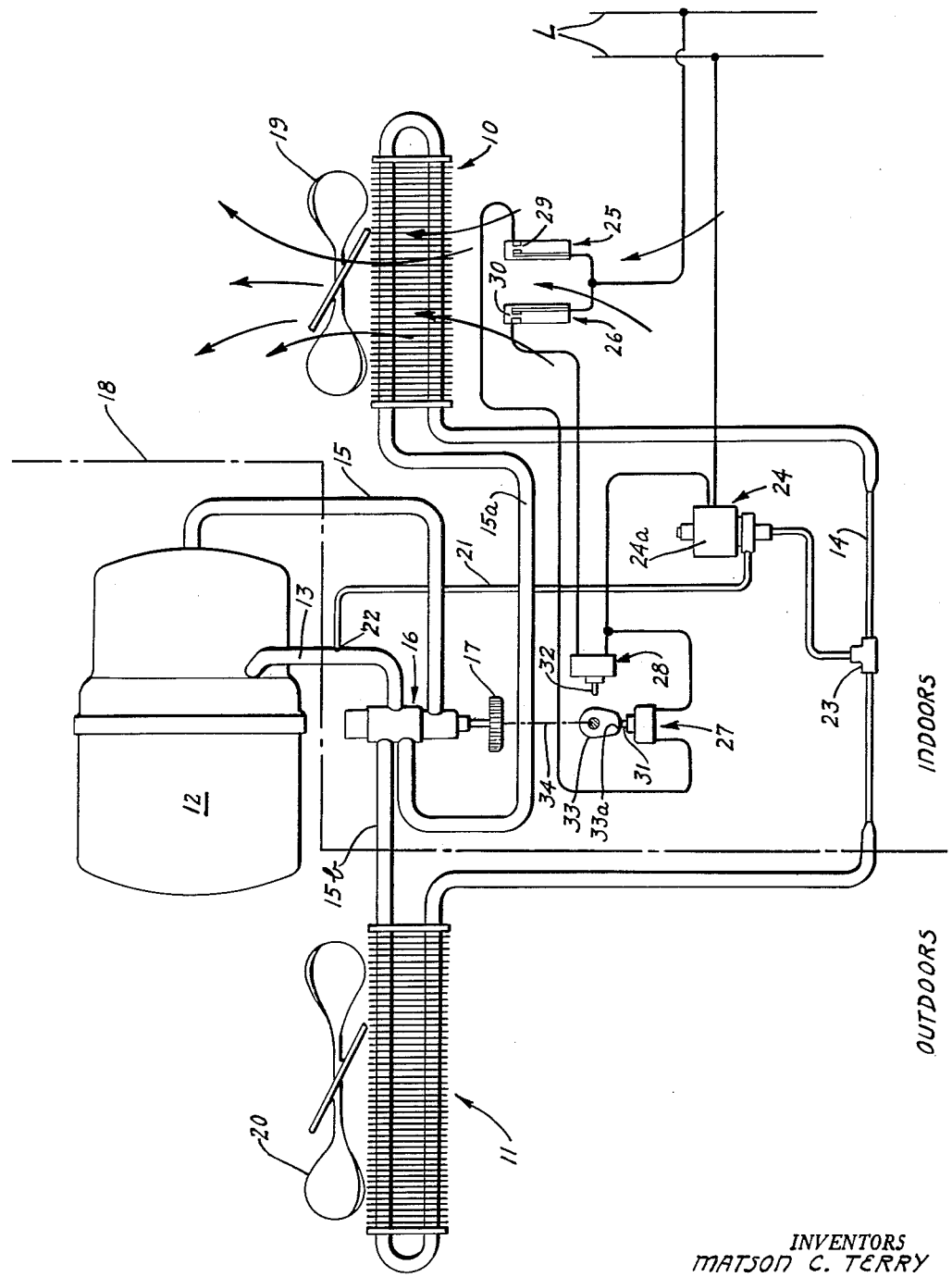

AIR CONDITIONING SYSTEM

Matson C. Terry, Philadelphia, and William F. Kramer, Cheltenham, Pa., assignors to Philco Corporation, Philadelphia, Pa., a corporation of Pennsylvania Application August 12, 1953, Serial No. 373,720

3 Claims. (Cl. 62—3)

The invention hereinafter disclosed and claimed is concerned with refrigeration apparatus and, while of broader applicability, has particular utility in the field of air conditioning equipment. The invention is especially concerned with reversible cycle refrigeration machines of the type which are adapted, selectively, either to cool or to heat an enclosure, for example a room to be conditioned.

In certain types of service, for example if an air conditioner is utilized to cool a bedroom at night, the dry bulb temperature of the circulating air may tend to drop below a predetermined minimum within the recognized "comfort zone" range of temperatures, and it is then desirable to "modulate" the capacity of the machine in such a way as to maintain the desired temperature condition. Similar requirements may be met when the machine is utilized to heat the space being conditioned, in which event it may be desirable to limit the maximum temperature of the circulating air.

In large installations, and in accordance with prior practice, modulation can conveniently be provided in a number of different ways. For example (and assuming that the machine is operating on the cooling cycle) the refrigerating effect can be modulated by varying the number of compressor cylinders effective to pump refrigerant, by varying the speed of the compressor, or by manipulating dampers to regulate air flow.

While temperature control is also a problem in the case of smaller refrigerating machines, such as single room package type air conditioners, the foregoing solutions are not applicable for a variety of reasons, including cost considerations. Also, many single room air conditioners utilize a compressor having only one cylinder, and it is therefore apparent that modulation of capacity by varying the number of cylinders is not feasible with such machines. Cycling the motor compressor, or varying the speed thereof, are undesirable solutions for a number of reasons, including the variation of sound level and current surges which result from cyclic or discontinuous operation. Such variation may be highly objectionable, and especially is this the case in bedroom applications.

With the foregoing in mind, it is the primary object of this invention to provide for control, or modulation, of the heat exchange capacity of the refrigerating machine and, specifically, to provide inexpensive, compact, reversible cycle air conditioning apparatus in which it is possible to effect temperature control on both the heating and the cooling cycles.

More particularly, the present invention is featured by provision of a reversible cycle refrigerating machine which includes apparatus responsive to the temperature of the conditioned air, to provide automatic control of said temperature on both cycles.

For reasons which will appear more fully in what follows, the invention is applicable to systems of the type which employ a continuously open restricted conduit, that is, a capillary tube, as the pressure reducing means.

In the achievement of the foregoing objectives, the invention provides, in novel combination with the elements of a reversible cycle air conditioning system of known type, capacity modulating apparatus in which gaseous refrigerant is utilized to vary the effective restriction of the capillary tube which interconnects the two heat exchangers and, specifically, the invention provides apparatus in which such modulation is achieved by effecting controlled introduction of gaseous refrigerant into the capillary tube in a region intermediate the ends thereof. Such apparatus has proven to be very effective, on both the heating and cooling cycles, in providing the necessary temperature control at the heat exchanger located within the space to be conditioned. On either cycle the refrigerant passes through the capillary tube, the direction of flow being determined by whether the last-mentioned heat exchanger is serving as an evaporator or as a condenser, and controlled introduction of gaseous refrigerant into the mid-region of said tube therefore makes it possible to vary the refrigerating effect during either cycle. As will be understood, the capillary tube passes a predetermined amount of refrigerant, by volume, in any given increment of time. This volumetric flow remains approximately constant regardless of the proportion of liquid-to-gaseous refrigerant. However as the quantity of gaseous refrigerant delivered to the mid-region of the tube is increased, the amount of refrigerant passing through the tube, by weight, is decreased, with a corresponding reduction in the refrigerating effect at that heat exchanger which is serving as the evaporator.

While in certain applications the refrigerant might be introduced into the capillary tube at various locations along the length thereof, the invention is particularly featured by the fact that introduction of the gaseous refrigerant into the mid-region of the tube makes it possible, in very simple manner, to achieve temperature control on either the heating or the cooling cycle. The truth of this will be recognized when it is understood that gaseous refrigerant introduced into the mid-region of the tube passes through about half the length of the tube, and therefore produces the above-described reduction in refrigerating effect, regardless of the direction of flow of refrigerant through said tube.

The manner in which the foregoing objects and advantages of the invention may best be achieved will be clearly understood from a consideration of the following detailed description, taken in conjunction with the accompanying drawing, the single figure of which is a diagrammatic representation of a refrigerating machine embodying the apparatus of our invention.

Making detailed reference to the drawing, there is diagrammatically illustrated a reversible cycle air conditioning or refrigerating system including a pair of heat exchangers 10 and 11. A compressor 12 is connected in series flow circuit with said heat exchangers through the agency of suitable conduits, including a discharge line 13, a capillary tube restrictor 14, a suction conduit 15, and suction-feed lines 15a and 15b. In accordance with known practice the suction conduit may be, and preferably is, disposed in heat exchange relation with the capillary tube 14. Such disposition of the capillary tube and the suction line has been omitted from the drawing in the interest of simplicity in illustration.

The equipment further includes a flow reversing valve 16 which may be of any one of several known types, and which is provided with a handle 17 through the agency of which the reversing valve is effective to place the suction and discharge lines in communication with the heat exchangers 10 and 11, respectively, or with the heat exchangers 11 and 10, respectively. As is apparent from the legend applied to the drawing, the heat exchanger 10 is disposed on the "indoors" side of partition means indicated by the dashed line 18, while the heat exchanger 11 and the compressor 12 are disposed on the "outdoors"

side of said partition. The heat exchanger 10 serves as an evaporator, when the apparatus is functioning on the cooling cycle, under which condition the heat exchanger 11 serves as a condenser. During cooling, refrigerant flowing from the compressor discharge line 13 passes from the valve through line 15b, which then serves as a feed line. Under this condition line 15a is, of course, included in the suction circuit.

When the heat exchanger 10 is being utilized to heat the space to be conditioned, the heat exchanger 11 operates as an evaporator, as will be understood. Line 15a is then in communication with the compressor discharge line 13, and line 15b communicates directly with the suction line 15. On both cycles the refrigerant passes through the capillary tube 14.

Provision is made for forcing air over the heat exchangers, or coils, and to this end fans of the type shown at 19 and 20 are employed, these fans being driven by a suitable motor, not shown.

The construction of the machine as described just above is conventional in nature, and its operation need not be set forth in further detail herein, except insofar as the elements thereof cooperate with and are affected by the novel temperature regulating, or capacity modulating, means now to be described.

In particular accordance with our invention there is provided a conduit 21, preferably of somewhat restricted cross sectional dimension, having one end connected to the high pressure side of the system, as is shown at 22 where said conduit is connected to the discharge line 13. The other end of conduit 21 is connected to the low pressure side of the system at the mid-region of the capillary tube, as is indicated at 23. Means is provided to control the flow of gaseous refrigerant through this conduit, and this means preferably takes the form of a solenoid-actuated valve device 24, of known type. When the valve, which is of the normally closed type, is opened, gaseous refrigerant flows through the conduit 21 and is delivered to the capillary tube 14, flowing through either the right-hand or the left-hand side thereof, depending upon whether the apparatus is operating on the cooling or the heating cycle, and as has already been described hereinabove.

To provide for control of the valve 24 the apparatus includes switching means responsive to the temperature of the air, or other medium, being conditioned. Preferably the switching means is disposed in the path of the air as it moves toward the "indoors" heat exchanger 10 under the influence of fan 19, but it will be understood that, in the broader aspect, the invention contemplates control of the valve through the agency of temperature responsive means, generally. The mentioned switching means might, for example, be responsive to the temperature of coil 10.

While a variety of switching arrangements would be applicable to the apparatus of our invention, we have chosen to illustrate switching equipment which comprises a pair of bi-metal blades or elements 25 and 26, and a pair of switches 27 and 28 each of which is adapted to place a corresponding one of the bi-metal elements in circuit across the line L. Each bi-metal element is provided with suitable contacts (see the contacts identified at 29 and 30) and each of the switches 27 and 28 has an actuating plunger, shown at 31 and 32, respectively, disposed for actuation by a cam 33 connected, through any suitable linkage 34, with the actuating handle 17 of the reversing valve 16. The operation of the apparatus is as follows.

The bi-metal element 25 is placed in circuit across the line L, by the "rise" 33a of cam 33 when the reversing valve is so adjusted as to cause the apparatus to operate on the cooling cycle, that is, when the heat exchanger 10 is effective to cool the space to be conditioned. The circuit through which the bi-metal element is placed across the line L is illustrated in the drawing and will be understood without further description, although it is to be noted that the circuit includes the solenoid 24a of valve device 24. Similarly, the bi-metal element 26 is adapted and calibrated to provide temperature control during the heating cycle—when the element 25 is not in circuit— and to this end said element 26 is placed across the line L by the cam 33 in response to suitable adjustment of the reversing valve 16. It is to be understood that, in practice, each of the bi-metal elements would be provided with means making it possible to adjust and calibrate the same.

Under the illustrated condition, that is, when the apparatus is serving as cooling means, if the temperature of the air flowing toward the heat exchanger 10 drops to a predetermined value in the range, for example, of from 70° to 75° F., the contacts 29 of the bi-metal element 25 are closed, with the result that the solenoid winding 24a of valve 24 is placed across the line L and the valve is moved to open position. As a result of such actuation of the valve, gaseous refrigerant is introduced into the capillary restrictor 14 and is there mixed with the condensed refrigerant flowing from heat exchanger 11 toward heat exchanger 10. Such mixture, as above described, results in a diminution of the quantity of refrigerant, by weight, passed by the capillary tube and the capacity of the heat exchanger 10 is correspondingly modulated in such a way as to minimize additional reduction in temperature and to restore the desired predetermined temperature of the air being cooled.

On the opposite cycle, that is when the apparatus is functioning to heat the space lying to the "indoors" side of the partition 18, bi-metal element 26 serves to control the valve 24, it being understood that the adjustment of reversing valve 16 which is required to establish the heating cycle serves also, through the link 34, to cause actuation of plunger 32 by means of cam 33. Under this latter condition, when the air approaching the heat exchanger 10 rises to a predetermined maximum value, which value might for example be in the neighborhood of 72° F., contacts 30 of bi-metal element 26 are closed, and flow through the conduit 21 is again established by virtue of opening of valve 24. Heat exchanger 10 serves, on the heating cycle, as a condenser, and the gaseous refrigerant introduced at 23 and the liquid refrigerant flowing from the heat exchanger 10 mix and pass through the capillary tube, thence flowing into the heat exchanger 11 which is serving as an evaporator. As indicated above, the resultant decrease in the quantity of refrigerant, by weight, passed by the capillary tube 14 correspondingly reduces the refrigerating effect at the heat exchanger 11, which serves as an evaporator during the heating cycle. Since less heat is, accordingly, absorbed at the heat exchanger 11, the "indoors" heat exchanger 10 is supplied with a lesser quantity of heat to dissipate to the air within the space being conditioned. Thus, as a result of introduction of gaseous refrigerant within the capillary tube, there is achieved limitation of the maximum temperature of the circulating air heated by the heat exchanger 10, which is then serving as a condenser. The bi-metal elements 25 and 26 are shown somewhat diagrammatically, and it will be understood that in practice such devices would preferably be of the "over-center" type having predetermined "cut-in" and "cut-off" points. Thermosensitive switch elements of this kind are well known in the refrigeration art and require no detailed disclosure herein.

From the foregoing description it will be understood that by the present invention there is provided apparatus capable of maintaining desired temperature conditions in the vicinity of a heat exchanger, regardless of the direction of flow of refrigerant through the restrictor, that is, regardless of the cycle upon which the equipment is operating. As has already been indicated, equipment of this kind is highly advantageous particularly because of the complete lack of variation in sound level, and also by virtue of the simple and inexpensive nature thereof.

The apparatus of the invention is susceptible of certain changes and modifications, without departing from the essential teaching thereof. For example, certain alternative arrangements can be resorted to for introducing gaseous refrigerant within the capillary tube. If resort is had to more complicated valving, gaseous refrigerant flowing through conduit 21 could be delivered to either end of the capillary tube, in accordance with the direction of flow therethrough. However it will of course be appreciated that the invention contemplates such changes and modifications as come within the scope of the appended claims.

We claim:

1. In a reversible cycle refrigerating system adapted, selectively, to heat or to cool an ambient medium, a compressor, first and second heat exchangers, the second heat exchanger being arranged to heat or cool said ambient medium, an elongated restrictor of the capillary tube type interconnecting said heat exchangers and serving to expand refrigerant from condensing pressure to evaporating pressure during both the heating and the cooling cycles, suction conduit means connected to the suction side of said compressor, discharge conduit means connected to the discharge side of said compressor, adjustable valve means connected to said heat exchangers and to both said suction and said discharge conduit means, said valve means being effective to connect said suction conduit means and said discharge conduit means to said first and said second heat exchangers, respectively, during the heating cycle, or to said second and said first heat exchangers, respectively, during the cooling cycle, and apparatus for adjusting the heat exchange capacity of said second heat exchanger on both the heating and the cooling cycles, said apparatus including: passage means connected to said discharge conduit means between said compressor and said valve means and extending to and into connection with said capillary restrictor in a region intermediate the ends thereof; and means for controlling flow of refrigerant through said passage means.

2. Apparatus in accordance with claim 1, and further characterized in that said last means is temperature responsive and is operatively connected with said adjustable valve means to provide for flow of gaseous refrigerant through said passage means when the temperature of said ambient medium has reached either a predetermined higher limit or a predetermined lower limit, in accordance, respectively, with whether the machine is operating on the heating or the cooling cycle.

3. In reversible cycle refrigeration apparatus of the type comprising refrigerant compressing means, a pair of heat exchangers interconnected by an elongated capillary type flow restrictor, adjustable valve means, and conduit means connecting each of said heat exchangers to said compressing means through said valve means, said valve means providing for flow of gaseous refrigerant from the discharge side of said compressing means to either of said heat exchangers, selectively, and for return of expanded refrigerant from the other of said heat exchangers to said compressing means, the improvement which comprises: passage means connected with the discharge side of said compressing means to derive gaseous refrigerant from said discharge side prior to passage of said gaseous refrigerant through said valve means for delivery to said heat exchangers, said passage means also extending to and into connection with said capillary restrictor in a region intermediate the ends thereof; and means for controlling flow of gaseous refrigerant through said passage means.

References Cited in the file of this patent

UNITED STATES PATENTS

| 2,276,814 | Zwickel | Mar. 17, 1942 |
| 2,342,174 | Wolfert | Feb. 22, 1944 |
| 2,344,215 | Soling | Mar. 14, 1944 |
| 2,388,314 | Eisinger | Nov. 6, 1945 |
| 2,453,131 | Hubbard | Nov. 9, 1948 |
| 2,481,469 | Brown | Sept. 6, 1949 |
| 2,495,228 | Berry | Jan. 24, 1950 |
| 2,655,793 | Shoemaker | Oct. 20, 1953 |
| 2,665,560 | Hubbard | Jan. 12, 1954 |